Aug. 24, 1965      R. L. MERKER           3,202,634
           SILARYLENESILOXANE BLOCK COPOLYMERS
                  Filed Aug. 24, 1960
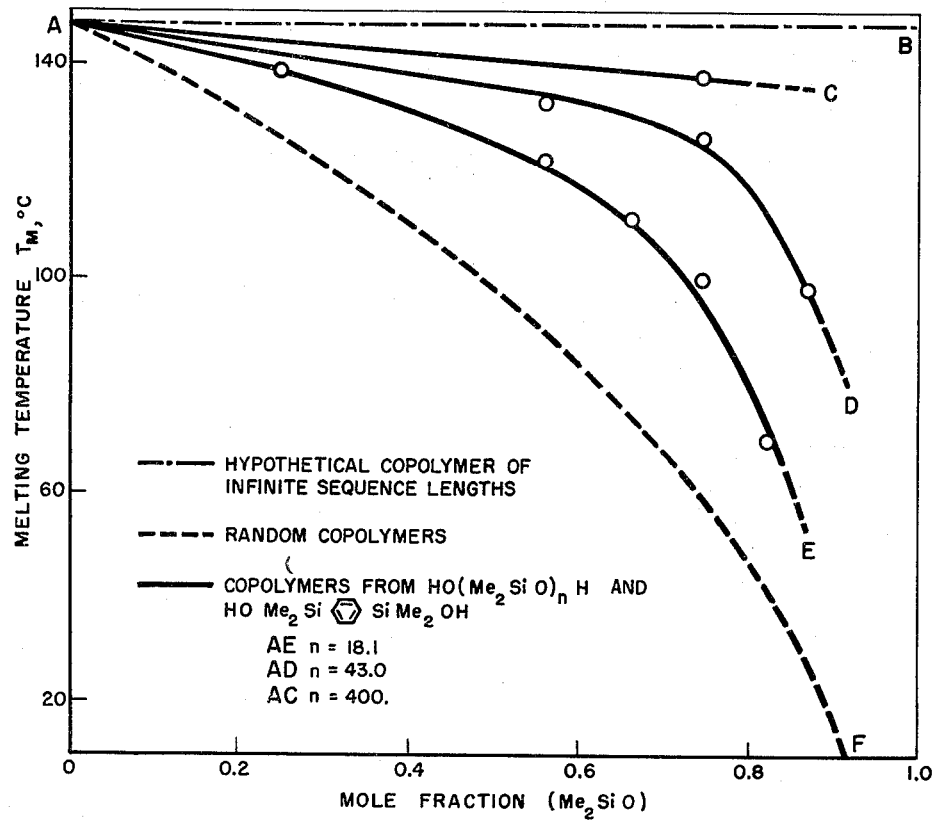
INVENTOR.
ROBERT L. MERKER
BY
ATTORNEY

United States Patent Office 3,202,634
Patented Aug. 24, 1965

3,202,634
SILARYLENESILOXANE BLOCK COPOLYMERS
Robert L. Merker, Pittsburgh, Pa., assignor to Dow Corning Corporation, Midland, Mich., a corporation of Michigan
Filed Aug. 24, 1960, Ser. No. 51,594
28 Claims. (Cl. 260—46.5)

The present invention relates to silarylenesiloxane block copolymers which have unique properties due to the "block" nature of their molecular configuration and due to the particular types of blocks present. It is also concerned with methods for the preparation of these unique copolymers, and with silicone rubber prepared therefrom.

Block copolymers can be described as linear copolymers in which the polymeric units are aggregated into blocks or segments, i.e. they are composed of alternating segments each of which contains its own distinct species of polymeric units. Neither the different types nor related types of segments are necessarily of equal length. Related types of segments, however, will of course have a particular average number of units present in each. In most block copolymer systems it is impossible to assign by analysis a specific value to the average number of units per segment, although probable minimum values and relative sizes of segments can be deduced from theoretical considerations.

An extremely simplified illustration of a block copolymer can be had by considering such a copolymer of A and B monomeric units. In block form, this could take a configuration such as:

... AAAAABBBAAAABBBBAAAAAABB ...

where the A block has an average of 5 units and the B block averages 3 units. Block copolymers are thus distinguished from "alternating" copolymers (e.g., ... ABABAB ...), and from "random" copolymers which on the average possess no such particular repeating sequence (for example,

... ABAAABABBAABBBABAB ...)

It will be seen that although the random copolymer may contain some "blocks" of units, relatively speaking the sequence does not maintain its integrity to the degree found in a true block copolymer. In other words a block copolymer is characterized by the fact that most blocks or segments are relatively close in length to the average length of all blocks containing the same monomeric units, whereas a random copolymer will have segments which vary in length over a wide range.

Block copolymers in accordance with this invention are further characterized by the occurrence of crystallization within the molecules at ordinary temperatures, i.e., portions of the polymer chains align themselves in parallel array. This is not to be confused with the crystallinity of materials in which the entire molecule forms a crystalline structure, as for example in sodium chloride. The present copolymers instead have the appearance of high viscosity fluids, gums, or elastomers, but the molecules are made up of alternating amorphous segments and crystalline regions which are called crystallites. To avoid any possible confusion, this characteristic will be referred to herein as "polymeric crystallinity." As pointed out by Flory ("Principles of Polymer Chemistry," Cornell University Press, 1953 edition), such so-called crystalline polymers are actually only semicrystalline. Because of the wide use of the former term, however, that language is employed here in preference to the latter.

Heretofore, elastomeric organosiloxanes have exhibited polymeric crystallinity only at extremely low temperatures. It is an object of this invention to provide new polymers in which such crystallinity occurs at ordinary temperatures (i.e., at about 25° C. and above). Further objects are to provide elastomeric organosiloxanes of extreme toughness and tensile strength, and vulcanized silicone rubber based thereon. Further objects and advantages will be apparent from the following description.

The copolymers of this invention can be defined as organosiloxane block copolymers exhibiting polymeric crystallinity at 25° C. and in which the copolymeric molecules consist essentially of (A) amorphous segments consisting of repeating units of the formula $R'_2SiO$ and (B) crystallite segments consisting of repeating units of the formula $-Si(R)_2Z(R)_2SiO-$, where each $R'$ is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4'-biphenylene, 4,4'-diphenylene ether, 4,4'-dimethylene benzene and 4,4'-dimethylenediphenyl ether radicals.

Since crystallinity in a polymer is not always easily detected, particularly as the polymer configuration moves ever closer to a purely amorphous state, the copolymers of this invention can also be defined as block copolymers of the above defined (A) and (B) units wherein at least 5 mol percent of the total units are (B) units.

The most distinctive physical properties distinguishing block copolymers of the above type from random copolymers containing the same kind and amount of polymeric units are the elasticity, tensile strength, and elongation properties of high molecular weight species of the former. High molecular weight linear organosiloxane random copolymers as known in the prior art possess virtually no tensile strength until they are filled with reinforcing fillers (such as fume silica) and/or "vulcanized" to form cross linkages. The defined block copolymers, in contrast, can exhibit considerable tensile strength even in the unfilled, unvulcanized state. The preferred copolymers have a tensile strength of at least 100 p.s.i. in that state, and the most preferred types range from 1,000 p.s.i. upwards. (These are conventional tensile strengths at break, based upon the original cross section of the sample prior to stress, i.e., "normal" tensile strengths.) It is also preferred that the copolymer have an elongation at break of at least 200 percent, and most preferably at least 400 percent.

It must be emphasized that tensile strengths of the above order of magnitude are unheard of in conventional unvulcanized linear organosiloxane polymers and copolymers, and can surpass the greatest strengths obtained in even the filled, vulcanized forms of the latter. The tensile strengths of the block copolymers as noted above are even more surprising when it is observed that the copolymers at this stage are still soluble in organic solvents such as benzene, toluene, xylene, and the like.

In order to obtain substantial tensile strengths as described above, the copolymeric molecules necessarily must be of sufficient length (i.e., sufficiently high degree of polymerization) that the product is not a fluid at ordinary temperatures. It is preferred that the average molecular size be great enough so that the intrinsic viscosity (in toluene, at 25° C.) is at least 0.9 deciliter per gram, and from 1.0 to about 2.2 is the most preferred range.

The tensile strength properties of the defined block copolymers as compared to the lack of such properties in random copolymers tends to show that polymeric crystallinity is definitely present in the block copolymers at ordinary temperatures. Stress-strain curves on various of these block copolymers show a rapid rise in tensile stress at relatively low elongations, followed by a rather sharp yield point. Beyond the yield point they show differing amounts of flow depending on the total amount of crystallinity present (i.e., depending upon total content of —Si(R)₂Z(R)₂SiO— units and relative sequence length), followed by another rapid rise in tensile stress. All of this indicates that random crystallinity is present in the unstressed copolymer, and that stress-induced crystallinity or orientation take place upon stretching the sample. The net result of these effects is a product which exhibits very high elongation at break and high tensile strength values, which in turn lead to extremely high "stressed" tensile strength values (i.e., based upon cross-section at break rather than original cross-section) ranging upwards into the region of 18,000 p.s.i.

Further evidence of the "block" nature and of the existence of polymeric crystallinity in the defined copolymers can be found in a study of the melting temperatures of the copolymers. At ordinary temperatures these copolymers have a milky opacity which disappears at a "melting temperature" which increases as the content of $$-Si(R)_2Z(R)_2SiO-$$

units and/or the sequence lengths increase. Reliable melting temperatures can be obtained by the use of a polarizing microscope equipped with a hot stage, the melting point being taken as the highest temperature where bi-refringence is still evidenced. This technique is described by Evans et al. [J. Chem. Phys., 15, 685 (1947)] and by Conix and Van Kerpel [J. Polymer Sci., 40, 521 (1959)], and the observed absolute copolymeric melting temperatures discussed herein were obtained by that technique.

In the defined block copolymers, in most instances the observed absolute copolymeric melting temperature is at least 10° C. (and often 40 to 70° C. or more) above the calculated melting temperature ($T_c$) of a random copolymer having the same molar concentration of (A) units $R'_2SiO$ and (B) units —Si(R)₂Z(R)₂SiO—, where ($T_c$) is calculated by the method of Flory (supra, pp. 568–571) from the relationship:

$$(1/T^c) - (1/T^\circ_m) = -(G/\Delta H_u) \ln N_B$$

where $T^\circ_m$ is the observed absolute melting temperature of a homopolymer of (B) units, G is the gas constant, $N_B$ is the mol fraction of (B) units in the copolymer, and $\Delta H_u$ is the heat of fusion per polymer unit of a homopolymer of (B) units.

It should be noted that the heat of fusion referred to above is the heat required to melt one mol of crystalline units, rater than one mol of semi-crystalline homopolymer. The latter value would be the latent heat of fusion, and it is dependent upon the degree of crystallinity existing in a particular homopolymer. The value of $\Delta H_u$ also is calculated by the method of Flory, in which one observes the depression of the homopolymer's melting temperature by diluents (such as, for example, dibutyl phthalate). The expression used to calculate $\Delta H_u$ is as follows:

$$[(1/T_m) - (1/T^\circ_m)]/v_1 = (G/\Delta H_u)(V_2/V_1)[1 - B(V_1 v_1/GT_m)]$$

where $T_m$ is the observed absolute melting temperature of the homopolymer-diluent mixture, $T^\circ_m$ is the observed absolute melting temperature of the homopolymer of (B) units, $V_1$ and $V_2$ are the molar volumes of diluent and polymer, respectively, $v_1$ is the volume fraction of diluent, G is the gas constant, and B is a diluent-polymer interaction parameter, found from the slope of the line obtained by plotting $[(1/T_m) - (1/T^\circ_m)]/v_1$ against $v_1/T_m$.

When each R in a homopolymer of the (B) units

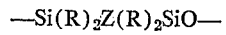

is methyl, Z is p-phenylene, and dibutyl phthalate is the diluent, $T^\circ_m$ is found to be 148° C., B is found to be 0.0 and $\Delta H_u$ is found to have a value of 4350 (calories per unit). These values were used to calculate $T_c$ for a random copolymer of these particular (B) units and Me₂SiO units, and the dotted line AF in the accompanying drawing shows the relationship between the $T_c$ values and the mole fraction of Me₂SiO units (where Me is methyl). The observed absolute melting temperatures for various specific block copolymers of these same units fall upon the lines AC, AD, and AE in the drawing. Both calculated and observed melting temperatures are shown in the drawing as $T_M$ temperatures in degrees Centigrade. More detailed reference will be made to these curves later herein, but the difference between block and random copolymers at any given content of the crystalline (B) units will be immediately obvious.

It should be noted that the $T_c$ values calculated as above and depicted by the line AF are probably higher than actual experimental values for random copolymers, because crystal growth leading to larger higher-melting crystallites would be hindered in a direction parallel to the copolymer chain axis by the presence of the Me₂SiO units. Hence the difference in melting temperatures between a block and a random copolymer can be expected to be even greater than that which has been illustrated. The line AB in the drawing represents the independence of melting point on composition in a hypothetical block copolymer of infinite sequence length when such a copolymer is composed of crystallizing and noncrystallizing units, as predicted by Flory [J. Chem. Phys. 17, 223 (1949); ibid., 15, 684 (1947)]. It can be seen that as block length is increased, the experimentally determined curves are approaching the hypothetical line AB.

As noted previously herein, it is not possible under present analytical techniques to assign an absolute value to the average length of the segments in the defined block copolymers. It is possible, however, to assign minimum values derived from theoretical considerations based upon the degree of polymerization of the starting materials employed. On this basis, the preferred copolymers of this invention can be defined as being comprised of blocks of the formula $[R'_2SiO]_a$ and blocks of the formula $$[-Si(R)_2Z(R)_2SiO-]_b$$

where $a$ has an average value greater than 10 and $b$ has an average value greater than 3. Since such a definition relies upon molecular structure rather than physical properties to distinguish the material from random copolymers, it should also be noted that preferably the molar ratio of total $R'_2SiO$ units to total —Si(R)₂Z(R)₂SiO— units in the block copolymer so defined should range from 10:90 to 95:5, the most interesting copolymers being found within the range from 40:60 to 90:10.

The validity of minimum values expressed for $a$ and $b$ above can be better understood when the preferred method for preparing the defined copolymers is considered. This method comprises reacting (A) an organosiloxanol [HO(R'₂SiO)ₙH] with (B) either a silarylene-silane diol [HOSi(R)₂Z(R)₂SiOH] or a partial condensate thereof. This is a condensation reaction, and preferably employs a silanol condensation catalyst which has substantially no siloxane-equilibration (i.e., rearrangement) capabilities under the reaction conditions and catalyst concentrations employed. Such a reaction must proceed with the subscript $n$ [i.e., the initial block length of the (R'₂SiO) segment] maintaining at least its initial value as a minimum value for $a$ in the copolymer product. A self-condensation reaction of the (A) reactant can and probably does take place to some extent concurrently with the co-condensation of (A) and (B), however, thus leading to average values of $a$ in the product which are undeterminable but which must be greater than the starting value of $n$ in the reactant.

From the above it will be seen that knowledge of the degree of polymerization (i.e., value of $n$) in the organosiloxanol reactant (A) makes it possible to designate only a minimum value of $a$ in the copolymer product. Now if the block copolymer is thought of as having the average formula $[(A)_a(B)_b]_z$ it will be seen that at any given molar ratio of total A to total B units, many different copolymers can exist which can have different physical properties even at a constant average molecular weight. This is true because although the ratio of $a$ to $b$ remains constant, the average value of $a$ and $b$ can go up or down while maintaining that constant ratio. It is also clear that if both the minimum average value for $a$ and the molar ratio of A to B units are known, the minimum average value for $b$ must be that which will maintain the constant $a/b$ ratio. For example, if it is known that $a$ is greater than 18 and that the ratio of A to B units is 75:25, then $b$ must be greater than 6 (i.e., 18 x 25/75).

From the above discussion it can be seen that valid minimum values for $a$ and $b$ can be set based upon the degree of polymerization of the (A) reactant and the ratio of (A) to (B) reactants employed. Although actual values for $a$ and $b$ cannot be obtained, it is practically certain that they are above the minimums so determined. From a comparison of lines AC, AD, and AE in the drawing it is also clear that definite differences in the copolymer products are brought about when the value of $n$ in reactant (A) is raised, i.e., when $a$ (and thus $b$) has a higher minimum value. Hence the extent of any co-condensation of A units which may take place obviously is not so great that it offsets the differences inherent in starting with higher polymeric siloxanols of A units, and under the reaction conditions employed may well be of no importance in its practical effect.

The organosiloxanols of the formula $HO(R'_2SiO)_nH$ employed in the preparation of the defined block copolymers are well known materials, and are often referred to as hydroxy end-blocked diorganosiloxanes. The preferred reactants are those in which $n$ has an average value of at least 10, and the most interesting copolymers are obtained when $n$ lies in the range of from about 18 to about 500. Each R' can be any monovalent hydrocarbon radical or halogenated monovalent hydrocarbon radical, and the same or different radicals can be attached to the same or different silicon atoms.

Examples of suitable R' radicals include alkyl radicals such as methyl, ethyl, and octadecyl; aryl radicals such as phenyl, xenyl, and naphthyl; alkaryl radicals such as tolyl and xylyl; aralkyl radicals such as benzyl; cycloalkyl radicals such as cyclohexyl; unsaturated aliphatic or cyclo-aliphatic radicals such as vinyl, allyl, propynyl, and cyclohexenyl; and halogenated derivatives of any of these such as dibromophenyl, chlorophenyl, tetrachloroxenyl, α,α,α-trifluorotolyl, and 3,3,3-trifluoropropyl radicals. The defined organosiloxanols can themselves be homopolymers, or block or random copolymers such as $HO[(Me_2SiO)_n(MePhSiO)_m]H$
$HO[(Me_2SiO)_n(Ph_2SiO)_m]H$
$HO[(Me_2SiO)_n(MeViSiO)_m]H$ and $HO[MeCF_3CH_2CH_2SiO)_n(MeViSiO)_m]H$, where Me, Ph, and Vi represent methyl, phenyl, and vinyl radicals respectively. If desired, a mixture of different organosiloxanols can be used as a reactant to provide more complex block copolymer products. Preferred organosiloxanol reactants are those in which all of the units are $Me_2SiO$ units, or in which $Me_2SiO$ and/or $R'_2SiO$ units are present (where each R' is a methyl, phenyl, vinyl, or $CF_3CH_2CH_2-$ radical but not more than one R' attached to any one Si atom is methyl). Any amount of the latter particularly defined $R'_2SiO$ units can be present in the organosiloxanol reactant, up to and including 100 percent of the total units.

It is to be understood that the designation $R'_2SiO$ units throughout this specification represents an actual structure which can be depicted as a

structure of alternating silicon and oxygen atoms. The first of these forms is used herein both for simplicity and because it is a conventional and well-understood form.

The silarylenesilane diol $[HOSi(R)_2Z(R)_2SiOH]$ which can be employed in the preparation of the defined block copolymers can be prepared by the techniques shown in detail in my copending application executed July 21, 1960 and entitled "Silarylenesilanes, Silanols, and Cyclotrisiloxanes," the disclosure of which is incorporated herein by reference. First the hydrogenosilane $HR_2SiZSiR_2H$ is prepared by reacting (1) a dihalide of the formula XZX, where X is Cl or Br, with (2) magnesium and (3) a silane of the formula $R_2HSiX$ (R and Z being as previously defined) by adding (1) to the magnesium in the presence of (3). The reaction is a modified Grignard reaction in which the Grignard reagent can be considered as being formed in situ, but never exists apart from the silane with which it would immediately react. Preferably an inert solvent such as tetrahydrofuran is used as a diluent for the reactants, and conventional Grignard reaction conditions can be employed.

The compound $HR_2SiZSiR_2H$ can be converted to the corresponding diol by hydrolysis with a solution of 5 to 15 percent NaOH or KOH in alcohol and water, preferably using 2 mols of the alkali per mol of the silane reactant, followed by neutralization with an acid or salt, e.g., acetic acid or potassium acid phosphate.

Each R radical in the defined diols can be any monovalent hydrocarbon radical free of aliphatic unsaturation. Illustrative radicals are the same as shown for R' above except that those containing aliphatic unsaturation are of course excluded. The divalent Z radicals, as previously noted, are p-phenylene, 4,4'-biphenylene, 4,4'-diphenylene ether, 4,4'-dimethylene benzene, and 4,4'-dimethylenediphenyl ether radicals. These radicals are respectively illustrated in the following structural formulae of the corresponding diols:

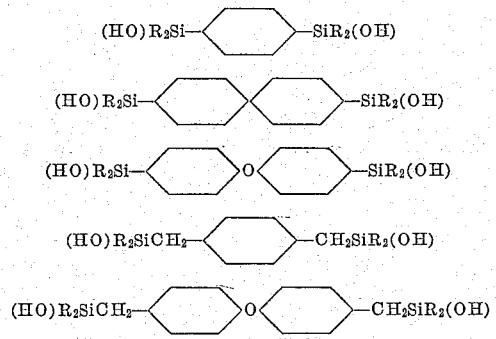

In the copolymeric segments derived from the above diols, the individual units have the formula $-Si(R)_2Z(R)_2SiO-$. This formula represents the structure:

In a copolymer containing blocks of such units, the first Si atom in the block is linked to the oxygen atom of an $R'_2SiO$ unit, and the last oxygen atom in the block is linked to the Si atom of an $R'_2SiO$ unit.

The reaction of the (A) organosiloxanol

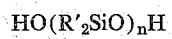

with the (B) silane diol $HOSi(R)_2Z(R)_2SiOH$ is brought about by intimately contacting the desired amounts of A and B reactants in the liquid phase. Preferably this is carried out in the presence of an inert diluent (e.g., benzene, toluene, xylene, or other organic solvents). The co-condensation reaction is expedited by elevated temperatures (e.g., 50° to 200° C.), and these can be applied at any stage in the process. Preferably a solution of the reactants is heated and then the solvent is removed, followed if desired by heating the reaction mass in the solvent-free state. The time of heating in either state will of course depend upon the molecular weight desired in the copolymer, the particular reactants and reaction temperature employed, and the particular condensation catalyst which may have been present.

Higher average block lengths can be obtained by starting with a partial condensate of the silane diol (B). The diol and the partial condensate both can be defined as having the formula HO[Si(R)$_2$Z(R)$_2$SiO]$_y$H where $y$ has a value of at least 1. In the partial condensate, $y$ can have any value greater than 1, including average values which are fractional because of mixed molecular species being present. Preferably the average value of $y$ is no greater than about 50. The partial condensates in question can be easily prepared by merely subjecting the diol (B) to condensation conditions prior to adding any

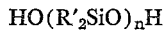

HO(R'$_2$SiO)$_n$H reactant to the system.

Only certain silanol-condensation catalysts can be used under a wide variety of conditions in the above described reaction if the desired block nature of the copolymer is to be formed and retained. The catalyst should be one which exhibits substantially no siloxane-equilibration characteristics under the reaction conditions and catalyst concentrations employed, i.e., it should not bring about any substantial siloxane bond rearrangement. Strong bases such as alkali metal or quaternary ammonium hydroxides and organosilicon salts thereof, and strong acids such as H$_2$SO$_4$ and HCl are good examples of catalysts which are used extensively in the organosiloxane art but which are generally not suitable here because of their rearrangement activity.

Of course, siloxane bond rearrangement and the random or block nature of a copolymer are both matters of degree, and time-temperature-concentration factors all enter into the picture in determining the degree of rearrangement brought about. For this reason, absolute limitations on reaction conditions have little or no meaning as applied to any single catalyst, much less as applied to the large groups of different types of catalysts known to be operative herein. For purposes of definition, a non-rearranging catalyst in the system in question is considered as one which at given concentrations, temperatures, and reaction times brings about an enhanced co-condensation of the (A) and (B) reactants defined above, but which produces a copolymer having a tensile strength of at least 100 p.s.i. in the unfilled, unvulcanized state rather than a copolymer having either no measurable tensile or a tensile strength below 100 p.s.i. The non-rearranging character of a condensation catalyst under given conditions also can be readily checked by adding the requisite amount to a copolymer which has been prepared in accordance with the specific examples herein and which has a tensile strength of at least 100 p.s.i. The mixture of copolymer and catalyst is then subjected to the time-temperature conditions under consideration, and if the copolymer retains a substantial degree of its original crystallinity and tensile strength, the catalyst can be considered as being non-rearranging under those conditions.

One type of catalyst which is effective herein is a salt of a basic amino compound and either (1) a phosphoric acid in which the only active hydrogen atoms are attached to phosphorus through an oxygen atom, or (2) a carboxylic acid in which the only active hydrogen atoms are a part of carboxyl groups attached only to carbon atoms, where any active hydrogen in said amino compound is attached to nitrogen and any remaining valences of the nitrogen are satisfied by carbon atoms, and there being at least 6 carbon atoms in any salt formed from (2). The basic amino compound can be ammonia or a primary-, secondary-, or tertiary amine. An "active hydrogen" in the above definition is one which forms methane when the compound is reacted with CH$_3$MgI at room temperature. Full details and extensive illustrations of the above salts are set forth in the copending Hyde application Serial No. 826,421, filed July 13, 1959, now U.S. Patent 3,160,601, and incorporated herein by reference. Ordinarily this type of catalyst will be employed herein in an amount of from about 0.1 to 1.0 percent by weight based on the total organosilicon reactants present. It is best, of course, to use those species within the above definition which are compatible with the rest of the system.

Another type of non-rearranging catalyst which may be employed is an organic isocyanate free of active hydrogen and having only one isocyanate group per molecule. Phenyl-, naphthyl-, dichlorophenyl-, p-nitrophenyl-, and ethyl isocyanates are illustrative of preferred species. Ordinarily this type of catalyst will be employed in an amount of about 0.5 to 1.5 mols of isocyanate per mol of silicon-bonded hydroxy groups in the system, and hence is most applicable where the molecular weight of the starting reactants is relatively high. These isocyanate catalysts are described in detail in the copending Falk application Serial No. 766,677, filed October 13, 1958, now U.S. Patent 3,032,530.

A further type of silanol condensation catalyst which is essentially non-rearranging in nature is found in the oxides of barium, strontium, and calcium. It is preferred that at least one mol of oxide be present for every two mols of silicon-bonded hydroxy groups. The use of such oxides is described in detail in the copending Bruner application Serial No. 807,035, filed April 17, 1959, now abandoned.

When the above described amine salts are used as catalysts, it is generally preferable to heat the reactants at about 50° to 120° C. for about 1 to 8 hours. A longer period of heating ordinarily does no harm, but in general will merely increase the cost of production without bringing about any particular improvement in properties. It will usually be preferable to carry out the copolymerization in an inert organic solvent capable of dissolving the copolymer which is formed. Precipitating the copolymer by the addition of a solvent which is compatible with the first solvent but incompatible with the copolymer affords a convenient method for separating the copolymer from the catalyst. It is sometimes desirable to increase the degree of polymerization of the copolymer by heating it in the solvent-free state at, for example, from 100° to 150° C. for up to about 24 hours.

Amazingly, the high molecular weight copolymers of this invention are ordinarily still completely soluble in hydrocarbon solvents and the like (for example, benzene, toluene, and xylene), thus indicating that a linear structure has been maintained with little or no cross-linking. The copolymers can be converted to insoluble "silicone rubber" by bringing about the formation of cross-linkages. This can be done by exposing the copolymer to ionizing radiation, using techniques which are well known with regard to the "vulcanization" of conventional silicone rubbers such as those prepared from dimethylpolysiloxanes. Convenient sources of such radiation are X-rays, radioactive isotopes such as cobalt 60, nuclear reactors and atomic piles, electron or particle accelerators such as betatrons, cyclotrons, resonant transformers and linear accelerators. A "Van de Graaff generator" has been found to be a convenient and practical source of such radiation. Thus the term "ionizing radiation" as used here refers to beta rays, gamma rays, X-rays, and accelerated electrons, neutrons, protons, deuterons, or alpha particles. The exposure to radiation will ordinarily be of sufficient duration and intensity to provide from about 0.1 to 10 megareps.

Another technique which can be used to bring about vulcanization or cross-link formation to provide cured, insoluble silicone rubber is to incorporate alkenyl groups into the copolymer and then subject it to the catalytic action of organice peroxides or azo compounds, sulfur, or sulfur-containing compounds. All of these catalysts are well known for their ability to produce organosiloxane rubbers from, for example, dimethylpolysiloxanes which contain vinyl, allyl, or similar alkenyl radicals attached to some of the silicon atoms in the polymer.

If desired, any of the usual fillers and additives can be incorporated into the defined copolymers before they are vulcanized to produce a silicone rubber. The conventional fillers are well known for such use, and include materials such as silica, titania, zinc oxide, ferric oxide, carbon black, and the like. Conventional additives include materials such as barium zirconate or oxides of mercury to improve compression set, pigments to produce rubbers of a particular color, thermal stability additives such as iron or cobalt salts of carboxylic acids, and many other well known materials to enhance various properties.

The silicone rubber prepared from the copolymers of this invention is characterized by its high strength and thermal stability, and can be used for electrical insulation, gasketing, and other uses for which the conventional silicone rubbers have become famous. In addition to their utility in the production of silicone rubber, the copolymers of this invention are useful, even without vulcanization, as potting compounds for electrical equipment and the like. The high tensile strength of the raw copolymeric gums also makes them useful as film formers and for gasketing or electrical insulation in situations where solvent resistance is not necessary. Since stretching brings about orientation of the copolymeric molecules with an attendant increase in tensile strength, they are ideally suited for the extrusion coating of wire and the like, where stretching and orientation can take place at the orifice of the extruder. Films, moldings, or extrusions of the raw gum maintain their shape because of their strength, and thus vulcanization can be either omitted or brought about at any convenient later stage in a particular operation, as desired.

The following examples are illustrative only. The symbols Me, Et, Ph, and Vi have been used to represent methyl, ethyl, phenyl, and vinyl radicals respectively. All parts and percentages are by weight unless otherwise indicated.

EXAMPLE 1

A mixture was prepared containing 70 parts

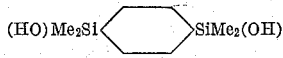

and 30 parts of a hydroxy end-blocked dimethylpolysiloxane [i.e., $HO(Me_2SiO)_nH$]. The latter had a viscosity of 51.8 cs. at 25° C. and a hydroxy content of 2.5 percent, representing an average degree of polymerization (D.P.), or value of $n$, of 18.1. A solution of 0.5 part tetramethylguanidine di-2-ethylhexoate in 30 parts benzene was added to the mixture as a catalyst. An additional 20 parts benzene was added and the mass was heated for 6.5 hours at reflux temperature, the formed water being removed from the refluxing benzene by means of an azeotrope trap. The resulting copolymer solution was diluted to 20 percent copolymer concentration by the addition of benzene. The copolymer was then precipitated by adding methanol (2 volumes per volume of benzene solution), thus leaving the catalyst in the benzene-methanol supernatant liquid. The precipitated copolymer was redissolved in pure benzene, and a cast film $\frac{1}{16}$ inch thick was prepared from a 20 percent polymer solution by allowing the benzene to evaporate at room temperature. It was cut into test pieces and tested in an Instron Tensile Tester to obtain stress-strain data. Rates of elongation (and relaxtion, where applicable) were two inches per minute, and tensile strength data so obtained is shown in Table I below.

In the table, "Normal Tensile" is the tensile strength at break in p.s.i. as based upon the original cross-section of the sample, whereas the "Stressed Tensile" is based upon the calculated cross-section at break assuming that the sample maintains a constant volume during stretching. "Pct. Elong." is of course the percent elongation of the sample at break. "Tension set" after 500 percent elongation was determined by stretching the sample to 500 percent of its original length (496% in this one case) and measuring its length after relaxation. The "Percent Tension Set" ("Pct. Ten. Set." in Table I) was calculated as $100 \times$ (length after stress-length original)/length original.

The intrinsic viscosity of the precipitated copolymer was found by taking the viscosity at 25° C. of toluene solutions at three different concentrations, and the value obtained is shown in Table I.

Additional copolymers were prepared by the above technique, varying the weight percent of the phenylene-linked (B) units from 70 down to 30. At 30 percent, however, the copolymer which was formed had no measurable tensile strength (i.e., no "gum tensile"). For this reason, this formulation was repeated but the technique was changed by allowing the

to polymerize by itself for one hour before $$HO(Me_2SiO)_nOH$$

was introduced into the system. The latter technique insured longer blocks of (B) units, and did result in a copolymer having tensile strength properties. In another modification of this 30 percent B formulation, the original technique was adhered to but the $$HO(Me_2SiO)_nH$$

employed had a viscosity of 86.5 cs. and an (OH) content of 1 percent, representing a D.P. of 43. The copolymers were all tested as described above, and the results are shown in Table I.

Table I

Block Copolymers of $Me_2SiO$ Units (A) and  Units (B)

| Run | Percent B Mole | Percent B Wt. | D.P. of Reactant A | Av. min. B per block | Intrinsic visc. | Normal tensile | Stressed tensile | Pct. elong. | Pct. ten. set |
|---|---|---|---|---|---|---|---|---|---|
| 1 | 44 | 70 | 18.1 | >14 | 1.53 | 2,725 | 16,000 | 496 | 250 |
| 2 | 33 | 60 | 18.1 | >9 | 2.00 | 2,085 | 17,848 | 643 | 216 |
| 3 | 25 | 50 | 18.1 | >6 | 2.11 | 1,840 | 16,957 | 750 | 138 |
| 4 | 18 | 40 | 18.1 | >4 | 1.91 | 1,137 | 12,581 | 962 | 63 |
| 5 | 13 | 30 | 18.1 | >2.5 | 1.29 | 0 | 0 | | |
| 6 | 13 | 30 | *18.1 | *)>2.5 | 0.955 | 452 | 3,810 | 667 | 103 |
| 7 | 13 | 30 | 43 | >6 | 1.14 | 553 | 4,361 | 717 | 82 |

*In run 6, the B component was polymerized by itself for 1 hour before introducing the A component.

In the above table, the approximate average minimum number of B units per block in the respective copolymers ("Av. Min. B per Block") is calculated from the degree of polymerization (D.P.) of the starting A reactant. The latter value represents the theoretical minimum average number of A units per block in the copolymer, and as the molar amount of total B units present decreases it is obvious that the average length of the B blocks must decrease correspondingly. In Run 1, for example, the blocks of A units would be expected to average something more than 18.1 units per block, therefore the blocks of B units should average more than 14.2 units [i.e., $44 \times 18.1/(100-44)$] per block. The values so calculated are only relative, but do have validity in observing the effects brought about by changing the formulation (and hence the structure) of the copolymer.

It is apparent from Table I that both the molar content of A and B units and the length of the blocks affect the properties of the copolymer. Runs 5, 6, and 7 are at constant molar ratios of total A and B units. The length of the B blocks (and hence of the A blocks) should be longer in Run 6 than in Run 5 because of the method of preparation. The length of the A blocks (and hence of the B blocks) should be longer in Run 7 than in Run 5 because of the nature of the A reactant employed. Longer blocks obviously have increased the tensile strength in these runs, and the shorter blocks in Run 5 have given the product the characteristics of a random copolymer. By comparing the other runs it can be seen that increasing the molar content of B units increases both the tensile strength and the tension set, i.e., the copolymer becomes stronger but the degree to which it returns to its original length after stretching becomes smaller.

EXAMPLE 2

This example illustrates the very definite difference between a block copolymer and a random copolymer in the system under consideration. Two samples of the block copolymer from Run 3 above (containing 50 percent by weight of B units) were dissolved in benzene. The two solutions were placed in narrow necked polymerization tubes, and to one there was added sufficient potassium dimethylsilanolate catalyst to provide 0.02 percent calculated as $K_2O$ based on the weight of polymer. Benzene was exhausted from both tubes under vacuum. The tubes were then sealed and heated at 175° C. for 30 hours. The uncatalyzed polymer was found to be unchanged, i.e., it still possessed its original tensile strength in the unfilled, unvulcanized state. The sample containing the catalyst, in contrast, had become an amorphous copolymer with no measurable "gum tensile." Since potassium dimethylsilanolate is known to be an "equilibration" or "rearranging" catalyst for siloxanes, it is clear that the block copolymer had been rearranged to form a random copolymer.

Another illustration of the difference between block and random copolymers was obtained by polymerizing $(Me_2SiO)_3$ and

in the presence of potassium dimethylsilanolate (0.02% as $K_2O$). The ratio of reactants used was the same as in Run 3 above, and toluene was employed as the solvent in the same amount as the amount of benzene used in Run 3. After 8 hours reflux under an azeotrope trap the reaction mass was handled as in Run 3. A clear gum was obtained as the product. It had essentially no gum tensile or any other properties indicative of polymeric crystallinity, and was obviously an amorphous random copolymer.

EXAMPLE 3

Samples of the copolymers from Runs 1 to 4 and 7 were redissolved in benzene to provide about 20 percent copolymer solutions, and films about 0.004 cm. in thickness were cast by evaporating the benzene at room temperature. Additional copolymers were made by the same technique as in Example 1, using 90, 70 or 50 weight percent of (B) components and hydroxy end-blocked dimethylpolysiloxanes having a D.P. of 18.1, 43, or 400. Films were cast from these additional copolymers (Runs G, H, I, and J) as above. Melting temperatures of the various copolymers were determined using a polarizing microscope equipped with a heated stage. The stage was heated slowly to within 10 degrees of the melting temperature, then raised to the melting temperature over a two hour period. The temperature at which birefringence could no longer be observed as the sample was rotated in the polarized light was taken as the melting temperature. The values obtained are shown in Table II below, where the copolymers are arranged in the order of increasing $Me_2SiO$ content.

Table II

Block Copolymers of $Me_2SiO$ Units (A)

and $-Si(Me)_2\langle\rangle Si(Me)_2O-$ Units (B)

| Run | Mole Percent $Me_2SiO$ | D.P. of Reactant A | Av. Min. B per block | Melt. temp. °C. |
|---|---|---|---|---|
| G | 25 | 18.1 | >54 | 139 |
| 1 | 56 | 18.1 | >14 | 123 |
| H | 56 | 43 | >34 | 133 |
| 2 | 67 | 18.1 | >9 | 112 |
| 3 | 75 | 18.1 | >6 | 100 |
| I | 75 | 43 | >14 | 126.5 |
| J | 75 | 400 | >133 | 139 |
| 4 | 82 | 18.1 | >4 | 69.5 |
| 7 | 87 | 43 | >6 | 97.5 |

The melting temperatures as shown in Table II are plotted against the mole fraction of $Me_2SiO$ units in the drawing, where lines AE, AD, and AC represent copolymers prepared from $OH(Me_2SiO)_nH$ having a D.P. of 18.1, 43, and 400 respectively.

In order to compare the melting points of the above block copolymers with those calculated for a random copolymer of the same composition, the melting temperature for a homopolymer of (B) units and the depression of that melting temperature by diluents was studied. The homopolymer was prepared by the general technique of Example 1 above, except that no $HO(Me_2SiO)_nH$ was introduced and the precipitated polymer was heated at 110° C. in the solvent free state before being redissolved in benzene. Films were cast from samples of this solution and from other samples to which known quantities of dibutyl phthalate had been added. Melting temperatures were obtained as discussed above, and are shown in Table III below.

Table III

| Volume fraction ($v_1$) of dibutyl phthalate: | Melting temperature, °C. |
|---|---|
| 0 | 148 |
| 0.0471 | 145 |
| 0.1111 | 141 |
| 0.2143 | 134.5 |
| 0.3107 | 130.5 |
| 0.3991 | 126 |

From the above data the heat of fusion per polymer units ($\Delta H_u$) was calculated from the expression:

$$[(1/T_m)-(1/T°_m)]/v_1 = (G/\Delta H_t)(V_2/V_1)[1-B(V_1v_1/GT_m)]$$

where $T°_m$ and $T_m$ are the absolute melting temperatures of the pure homopolymer and the homopolymer-diluent mixtures, respectively; $V_1$ and $V_2$ are the molar volumes of diluent and polymer, respectively; $v_1$ is the volume fraction of diluent, G is the gas constant, and B is a diluent-polymer interaction parameter, found from the slope of the line obtained by plotting $$[(1/T_m)-(1/T°_m)]/v_1$$

against $v_1/T_m$. The slope of the latter line (and hence the value of B) was found to be 0 from the above data, and $\Delta H_u$ was calculated to have a value of 4350 calories per unit. Using the latter value, the calculated melting temperature ($T_c$) of a series of random copolymers was computed from the expression:

$$(1/T_c)-(1/T°_m)=-(G/\Delta H_u)\ln N_B$$

where $T°_m$ is the absolute melting temperature of the pure homopolymer of (B) units

i.e. 148, and $N_B$ is the mole fraction of (B) units in the random copolymer. The $T_c$ values so computed are plotted in the drawing as line AF.

From the drawing it is immediately apparent that at any given composition, the block copolymers possess higher melting temperatures than those calculated for random copolymers. It is also evident that increasing the average block length leads to higher melting temperatures in the copolymer, approaching the horizontal line AB which represents the independence of melting temperature on composition which has been predicted for hypothetical block copolymers of infinite sequence length.

EXAMPLE 4

The preparation of block copolymers as in Example 1 was repeated, except that 1 part n-hexylamine 2-ethylhexoate was employed in place of the 0.5 part tetramethylguanidine di-2-ethylhexoate. The products obtained exhibited the same gum tensile properties and other indications of polymeric crystallinity as the Example 1 copolymers. Similarly, block copolymers are obtained when isobutylamine oleate, t-butylamine decanoate, decylamine laurate, t-butylamine acetate, di-n-hexylamine acetate, di-n-hexylamine benzoate, triethylamine myristate, tetramethylethylenediamine 2 - ethylhexoate (mono salt), eicosylamine phosphate, di-eicosylamine phosphate, or bis-eicosylamine succinate are employed in the same manner, or when barium-, strontium-, or calcium oxide are employed in an amount of 0.5 mol of the oxide per mol of Si-bonded OH present in the system.

EXAMPLE 5

A mixture of 50 parts

and 50 parts of a hydroxy end-blocked dimethylpolysiloxane having a viscosity of 1950 cs. at 25° C. (D.P. about 297) was copolymerized by the technique of Example 1, except that 1 part n-hexylamine 2-ethylhexoate was used as the catalyst and the formed copolymer product was heated an additional 2 hours at 150° C. in the solvent free state. By fractional precipitation from a benzene solution, this copolymer was separated into two parts. One part was largely polymeric dimethylpolysiloxane, the other was a copolymer containing about 37 percent by weight Me$_2$SiO and 63 percent

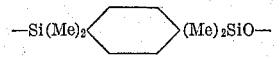

units (i.e., the average minimum B units per block must have been greater than about 180). The second part was a relatively hard material with a very slippery feel. It remained milky in appearance at very elevated temperatures, thus showing that where the block sequences of a copolymer are of sufficient length they can be incompatible in one another even when the p-silphenylene-siloxane segments of the chain are in their amorphous state.

EXAMPLE 6

When 50 parts of a hydroxy end-blocked diorganopolysiloxane in which the polymeric units are 80 mol percent Me$_2$SiO, 1.0 mol percent MeViSiO, 4.0 mol percent Ph$_2$SiO, and 15 mol percent Me(CF$_3$CH$_2$CH$_2$)SiO units, said diorganopolysiloxane having a D.P. of about 40, is reacted with 50 parts of

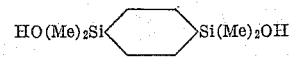

in the manner of Example 1, a block copolymer exhibiting polymeric crystallinity at 25° C. is obtained. This is also true when the diorganopolysiloxane is a copolymer containing 93 mol percent Me$_2$SiO, 5 mol percent MeEtSiO, 1.9 mol percent (ClC$_6$H$_4$)MeSiO and 0.1 mol percent MeBiSiO units; or 93 mol percent Me$_2$SiO and 7 mol percent MePhSiO units; or 99.5 mol percent Me(CR$_3$CH$_2$CH$_2$)SiO and 0.5 mol percent MeViSiO units.

EXAMPLE 7

A mixture of 100 parts of the Run 3 copolymer from Table I, 40 parts of silica, and 1 part t-butylperbenzoate was prepared by milling the components. The silicone rubber stock so prepared was vulcanized by press-molding the stock for 10 minutes at 150° C., followed by an after-cure of 1 hour at 250° C. The product was no longer soluble in organic solvents, although it was swelled thereby.

EXAMPLE 8

By the method of Example 1, a copolymer was prepared from 50 parts

and 50 parts of a hydroxy end-blocked dimethylsiloxane-methylvinylsiloxane copolymer having a viscosity of 45 cs. at 25° C. (99.5 mol percent Me$_2$SiO, 0.5 mol percent MeViSiO). A milled mixture of 100 parts of the copolymer, 40 parts silica, and 0.5 part t-butylperbenzoate was press-molded and cured as in Example 7. The silicone rubber product was solvent-insoluble and had a "strip tear" strength of 93 p.s.i. When measured by the same test, ordinary commercial silicone rubber had a strip tear strength of only 15 p.s.i., and the very best of the special "high tear strength" silicone rubber commercially available had strip tear strengths of 60 to 70 p.s.i.

EXAMPLE 9

A sample of the Run 3 copolymer from Table I was exposed to about a 10 megarep dosage of radiation from cobalt 60. The sample was found to have become insolubilized toward organic solvents, thus showing that the copolymer had become cross-linked.

EXAMPLE 10

By subjecting the corresponding dihydrogensilanes (HR$_2$SiZSiR$_2$H) to hydrolysis by a solution containing 10 parts KOH in 50 parts water and 40 parts ethanol )using 1 mol KOH per mol of Si-bonded hydrogen), followed by neutralization of the hydrolyzate with potassium acid phosphate, the following diols can be produced:

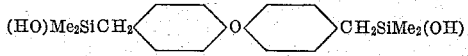

When any of these diols is used in place of

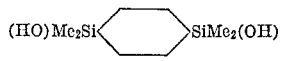

in the process of Example 1, the corresponding block copolymers are produced.

That which is claimed is:

1. A soluble organosiloxane block copolymer exhibiting polymeric crystallinity at 25° C. and in which the copolymeric molecules consist essentially of (A) amorphous segments consisting of linked repeating units of the formula R′$_2$SiO having an average minimum number of at least 10 units of R′$_2$SiO and (B) crystallite segments consisting of linked repeating units of the formula —Si(R)$_2$Z(R)$_2$SiO— having an average minimum number of at least 3 units of —Si(R)$_2$Z(R)$_2$SiO—, where each R′ is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4′-biphenylene, 4,4′-diphenylene ether, 4,4′-dimethylene benzene, and 4,4′-dimethylenediphenyl ether radicals, the molar ratio of total R′$_2$SiO units to total —Si(R)$_2$Z(R)$_2$SiO— units ranging from 10:90 to 95:5.

2. A soluble organosiloxane block copolymer in accordance with claim 1 wherein each R and each R′ radical is a methyl radical and Z is a p-phenylene radical.

3. A soluble organosiloxane block copolymer comprising blocks having an average minimum of at least 10 units of linked repeating units (A) of the formula R′$_2$SiO and blocks having an average minimum at least 3 units of linked repeating units (B) of the formula —Si(R)$_2$Z(R)$_2$SiO—, where each R′ is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4′-biphenylene, 4,4′-diphenylene ether, 4,4′-dimethylene benzene, and 4,4′-dimethylenediphenyl ether radicals, the molar ratio of total R′$_2$SiO units to total —Si(R)$_2$Z(R)$_2$SiO— units ranging from 10:90 to 95:5.

4. A soluble organosiloxane block copolymer having a tensile strength of at least 100 p.s.i. in its unfilled, unvulcanized state as tested at 25° C., said copolymer being comprised of blocks having an average minimum of at least 10 units of linked repeating units (A) of the formula R′$_2$SiO and blocks having an average minimum of at least 3 units of linked repeating units (B) of the formula —Si(R)$_2$Z(R)$_2$SiO—, where each R′ is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4′-biphenylene, 4,4′-diphenylene ether, 4,4′-dimethylene benzene, and 4,4′-dimethylenediphenyl ether radicals, the molar ratio of total R′$_2$SiO units to total —Si(R)$_2$Z(R)$_2$SiO— units ranging from 10:90 to 95:5.

5. A soluble organosiloxane block copolymer in accordance with claim 4 wherein each R and each R′ is a methyl radical and Z is a p-phenylene radical.

6. A benzene-soluble organosiloxane linear block copolymer having a tensile strength of at least 1000 p.s.i. in its unfilled, unvulcanized state and having an intrinsic viscosity of from 1.0 to 2.2 inclusive, said copolymer consisting essentially of blocks having an average minimum of at least 10 units of linked repeating units (A) of the formula R′$_2$SiO and blocks having an average minimum of at least 3 units of linked repeating units (B) of the formula —Si(R)$_2$Z(R)$_2$SiO—, where each R′ is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4′-biphenylene, 4,4′-diphenylene ether, 4,4′-dimethylene benzene, and 4,4′-dimethylenediphenyl ether radicals, the molar ratio of total R′$_2$SiO units to total —Si(R)$_2$Z(R)$_2$SiO— units ranging from 10:90 to 95:5.

7. A benzene-soluble organosiloxane linear block copolymer in accordance with claim 6 wherein each R and each R′ is a methyl radical and Z is a p-phenylene radical.

8. A benzene-soluble organosiloxane linear block copolymer having a tensile strength of at least 1000 p.s.i. in its unfilled, unvulcanized state and which consists essentially of (A) blocks having an average minimum of at least 10 units of linked repeating units of the formulae (CH$_3$)$_2$SiO and R′$_2$SiO where each R′ is selected from the group consisting of methyl, phenyl, vinyl and CF$_3$CH$_2$CH$_2$— radicals, not more than one R′ radical attached to any one Si atom being methyl, and (B) blocks having an average minimum of at least 3 units of linked repeating units of the formula —Si(CH$_3$)$_2$Z(CH$_3$)$_2$SiO— where Z is a p-phenylene radical, the molar ratio of total (CH$_3$)$_2$SiO and R′$_2$SiO units to total —Si(CH$_3$)$_2$Z(CH$_3$)$_2$SiO— units ranging from 10:90 to 95:5.

9. A soluble organosiloxane block copolymer comprising blocks having an average minimum of at least 10 units of linked repeating R′$_2$SiO units (A) and blocks having an average minimum of at least 3 units of linked repeating —Si(R)$_2$Z(R)$_2$SiO— units (B) where each R′ is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4′-diphenylene, 4,4′-diphenylene ether, 4,4′-dimethylene benzene, and 4,4′-dimethylenediphenyl ether radicals, said block copolymer having an observed absolute copolymeric melting temperature ($T_p$) at least 10° C. above the calculated melting temperature ($T_c$) of a random copolymer having the same molar concentration of (A) and (B) units as the aforesaid block copolymer, the observed melting temperature ($T_p$) being taken as the highest temperature where bi-refringence is still evidenced as observed with a polarizing microscope and ($T_c$) being calculated from the equation $$(1/T_c) - 1/T°_m) = -(G/\Delta H_u) \ln N_B$$

where $T°_m$ is the observed absolute melting temperature of a homopolymer of (B) units, G is the gas constant, $N_B$ is the mol fraction of (B) units in the copolymer, and $\Delta H_u$ is the heat of fusion per polymer unit of a homopolymer of (B) units, the molar ratio of total R′$_2$SiO units to total —Si(R)$_2$Z(R)$_2$SiO— units ranging from 10:90 to 95:5.

10. A soluble organosiloxane block copolymer in accordance with claim 9 wherein each R and each R′ radical is a methyl radical, Z is a p-phenylene radical, $\Delta H_u$ has a value of 4350, $T°_m$ has a value of 148, and the observed absolute copolymeric melting temperature $T_p$ is less than 148° C.

11. A soluble organosiloxane block copolymer consisting essentially of blocks having an average minimum of at least 10 units of linked repeating (CH$_3$)$_2$SiO units (A) and blocks having an average minimum of at least 3 units of linked repeating —Si(CH$_3$)$_2$Z(CH$_3$)$_2$SiO— units (B) where Z is a p-phenylene radical, said copolymer having in the unfilled, unvulcanized state a tensile strength greater than 100 p.s.i. and an elongation at break greater than 200 percent and having an observed absolute copolymeric melting temperature ($T_p$) at least 10° C. above the calculated melting temperature ($T_c$) of a random copolymer having the same molar concentration of (A) and (B) units as the aforesaid block copolymer, the observed melting temperature $T_p$ being taken as the highest temperature where bi-refringence is still evidenced as observed with a polarizing microscope and ($T_c$) being calculated from the equation $$(1/T_c)-(1/T°_m) = -(G/\Delta H_u) \ln N_B$$

where $T°_m$ is 148, G is the gas constant, $N_B$ is the molar fraction of (B) units in the copolymer, and $\Delta H_u$ is 4350, the molar ratio of total $R'_2SiO$ units to total $$-Si(R)_2Z(R)_2SiO-$$

units ranging from 10:90 to 95:5.

12. A soluble organosiloxane block copolymer comprising blocks of the formula $[R'_2SiO]_a$ and blocks of the formula $[-Si(R)_2Z(R)_2SiO-]_b$, where $a$ has an average minimum value of at least 10, $b$ has an average minimum value of at least 3, each R' is selected from the group consisting of monovalent hydrocarbon radicals and halogenated monovalent hydrocarbon radicals, each R is a monovalent hydrocarbon radical free of aliphatic unsaturation, and Z is a divalent radical selected from the group consisting of p-phenylene, 4,4'-biphenylene, 4,4'-diphenylene ether, 4,4'-dimethylene benzene, and 4,4'-dimethylenediphenyl ether radicals, the molar ratio of total $R'_2SiO$ units to total $-Si(R)_2Z(R)_2SiO-$ units ranging from 10:90 to 95:5.

13. A soluble organosiloxane block copolymer in accordance with claim 12 which in the unfilled, unvulcanized state has a tensile strength of at least 100 p.s.i.

14. A soluble organosilozane block copolymer in accordance with claim 12 which in the unfilled, unvulcanized state has a tensile strength of at least 1000 p.s.i. and an elongation at break of at least 200 percent.

15. A benzene-soluble linear organosiloxane block copolymer consisting essentially of blocks of the formula $[(CH_3)_2SiO]_a$ and blocks of the formula $$[-Si(CH_3)_2Z(CH_3)_2SiO-]_b$$

where $a$ has an average minimum value of at least 10, $b$ has an average minimum value of at least 3, and Z is a p-phenylene radical, the molar ratio of total $(CH_3)_2SiO$ units to $-Si(CH_3)_2Z(CH_3)_2SiO-$ units ranging from 40:60 to 90:10.

16. A vulcanized insoluble silicone rubber in which the silicone component consists essentially of the copolymer of claim 1.

17. A vulcanized insoluble silicone rubber in which the silicone component consists essentially of the copolymer of claim 7.

18. A vulcanized insoluble silicone rubber in which the silicone component consists essentially of the copolymer of claim 9.

19. A vulcanized insoluble silicone rubber in which the silicone component consists essentially of the copolymer of claim 15.

20. A method for the preparation of an organosiloxane block copolymer which comprises cocondensing (A) an organosiloxanol of the formula $HO(R'_2SiO)_nH$ with (B) a diol of the formula $HO[Si(R)_2Z(R)_2SiO]_yH$ by intimately contacting (A) and (B) in the liquid phase under conditions such that substantially no siloxane bond rearrangement takes place, in the above formulae $n$ having an average minimum value of at least 10, $y$ having an average value of at least 1, each R being a monovalent hydrocarbon radical free of aliphatic unsaturation, each R' being selected from the group consisting of monovalent hydrocarbon radicals and halogenated monovalent hydrocarbon radicals, and Z being a divalent radical selected from the group consisting of p-phenylene, 4,4'-biphenylene, 4,4'-diphenylene ether, 4,4'-dimethylene benzene, and 4,4'-dimethylenediphenyl ether radicals.

21. A composition in accordance with claim 1 in which (A) consists essentially of $(CH_3)_2SiO$ and $R'_2SiO$ repeating units in which R' is selected from the group consisting of methyl, phenyl, vinyl, and $CF_3CH_2CH_2-$ radicals, not more than one R' attached to any one silicon atom being methyl and (B) consists of repeating units of the formula

22. A composition in accordance with claim 1 in which (A) consists essentially of $(CH_3)_2SiO$ and $R'_2SiO$ repeating units in which R' is selected from the group consisting of phenyl, methyl, vinyl, and $CF_3CH_2CH_2-$ radicals, not more than one R' attached to ony one silicon atom being methyl and (B) consists essentially of repeating units of the formula

23. A composition in accordance with claim 1 in which (A) consists essentially of repeating units of the formula

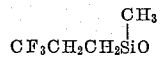

and (B) consists essentially of repeating units of the formula

24. A composition in accordance with claim 1 in which (A) consists essentially of repeating units of the formula $(CH_3)_2SiO$ and (B) consists essentially of repeating units of the formula

25. The method in accordance with claim 20 in which each R and R' is a methyl radical and Z is a phenylene radical.

26. The method in accordance with claim 20 in which each R is a phenyl radical and each R' is a methyl radical.

27. The method in accordance with claim 20 in which (A) consists essentially of

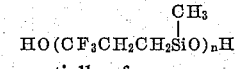

and (B) consists essentially of

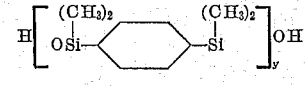

28. The method in accordance with claim 20 in which (A) consists essentially of

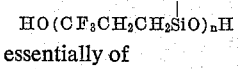

and (B) consists essentially of

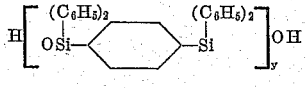

References Cited by the Examiner

UNITED STATES PATENTS

| | | | |
|---|---|---|---|
| 2,352,974 | 7/44 | Rochow | 260—46.5 |
| 2,562,000 | 7/51 | Sveda | 260—46.5 |
| 2,696,480 | 12/54 | Gordon et al. | 260—46.5 |

FOREIGN PATENTS 523,684  11/53  Belgium.

WILLIAM H. SHORT, *Primary Examiner.*

H. N. BURSTEIN, J. R. LIBERMAN, *Examiners.*